J. A. KOEHLER.
CIRCLE SWING.
APPLICATION FILED OCT. 9, 1914.
1,142,970.
Patented June 15, 1915.
2 SHEETS—SHEET 2.
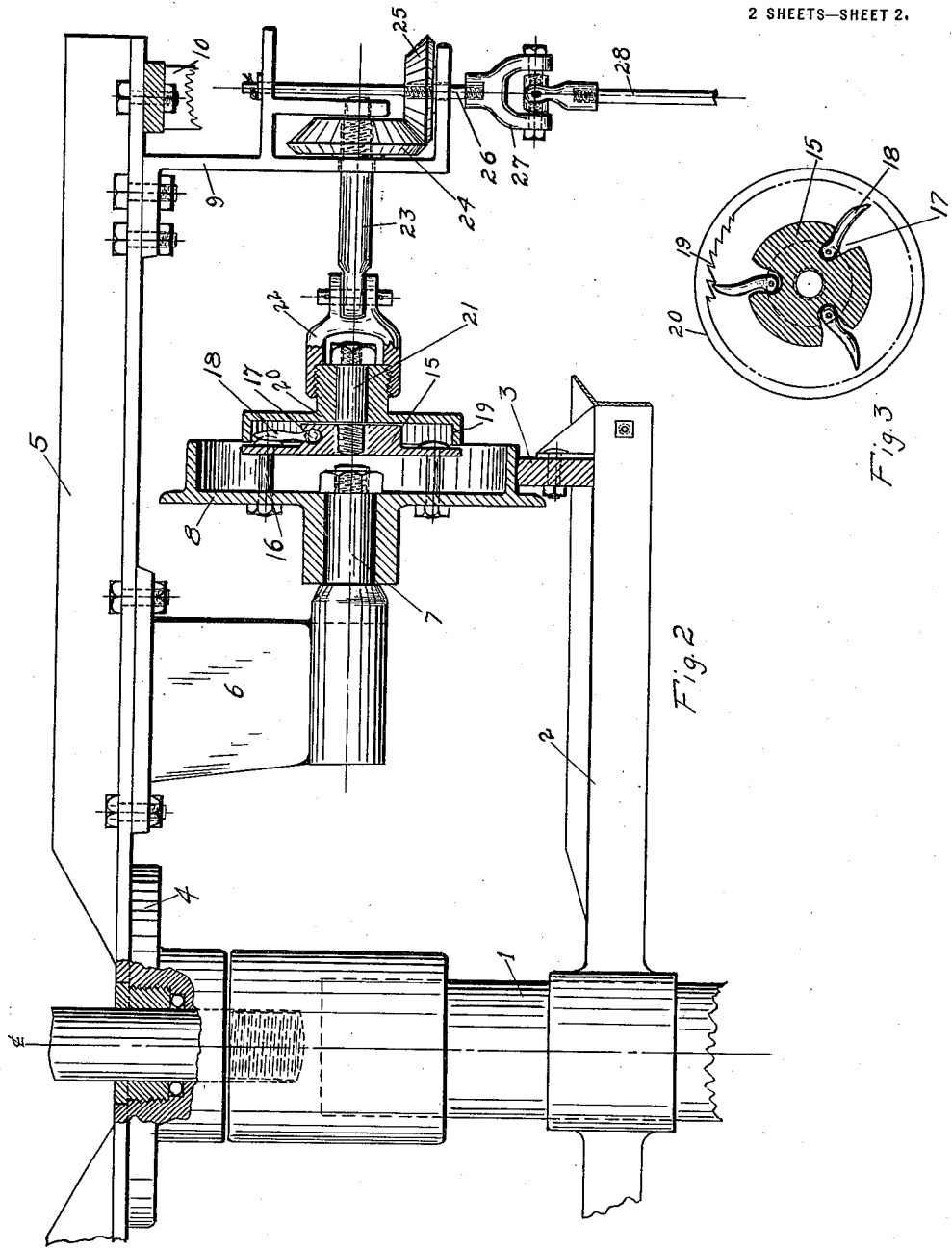
WITNESSES:
H. J. Allington
Joseph V. Carpenter
James A. Koehler, INVENTOR
BY
Geo. B. Willey
ATTORNEY.

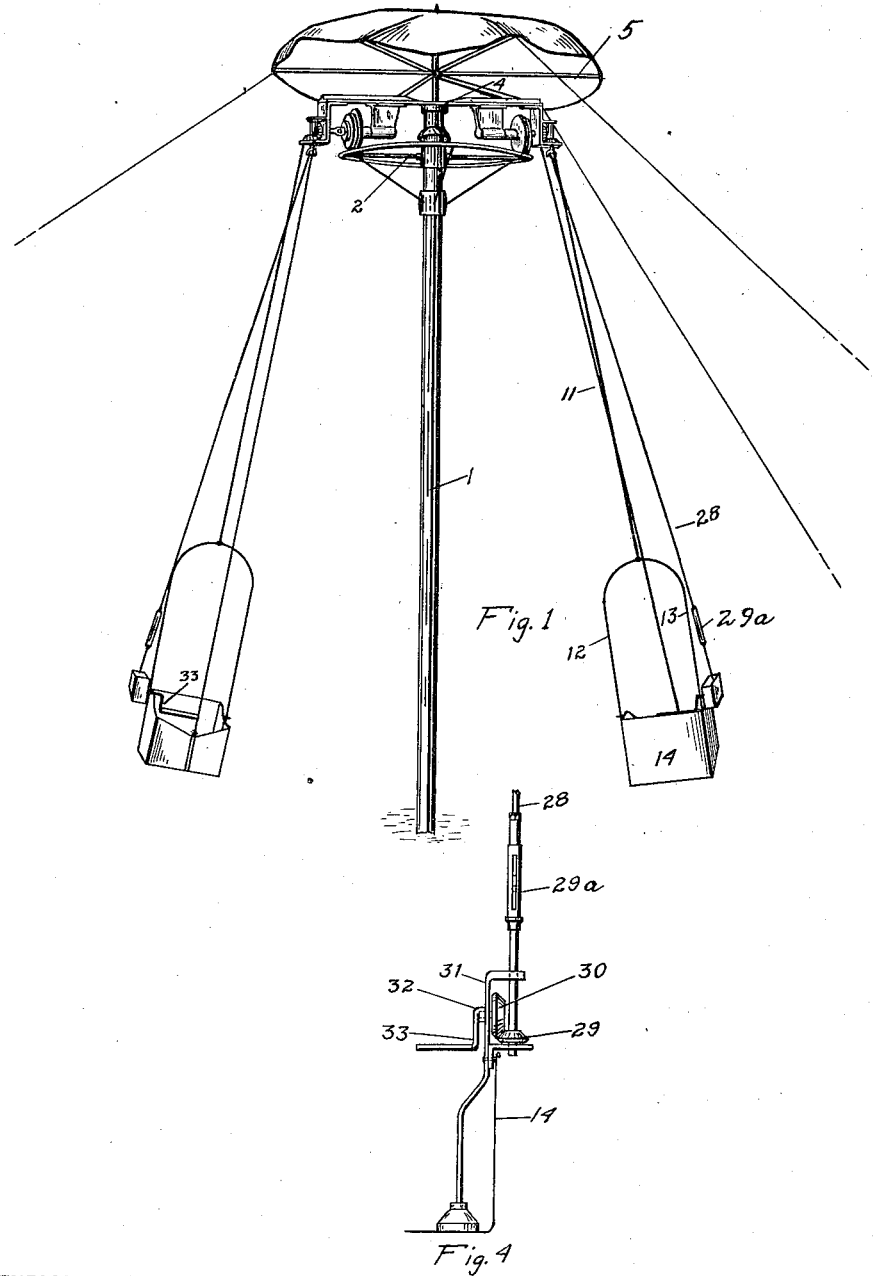

UNITED STATES PATENT OFFICE.

JAMES A. KOEHLER, OF SAGINAW, MICHIGAN.

CIRCLE-SWING.

1,142,970.

Specification of Letters Patent.

Patented June 15, 1915.

Application filed October 9, 1914. Serial No. 865,818.

*To all whom it may concern:*

Be it known that I, JAMES A. KOEHLER, a citizen of the United States, residing at Saginaw, in the county of Saginaw and State of Michigan, have invented certain new and useful Improvements in Circle-Swings; and I do hereby declare the following to be a full, clear, and exact description of the invention, such as will enable others skilled in the art to which it appertains to make and use the same.

This invention is a circle swing and the improvement pertains more particularly to that type of circle swings in which the cars containing the passengers are suspended from above by long rods or connections that permit the cars to swing out radially and describe larger circles as the speed increases, and the improvement pertains more particularly to certain improved arrangements of mechanism, whereby the swing may be propelled by the passengers in the cars.

One object of my improvement is to provide a simple yet strong and durable propelling mechanism that will automatically adapt itself to the change of position of the car as it swings outward.

A further object is to provide a driving means that will prevent injury to the occupant of the car if the speed is suddenly increased or desceased or if one operator works the propelling cranks in his car faster than the crank in the other car is turned.

A further object is to provide propelling means that will not permit the cars to be run backward.

With these and certain other objects in view which will appear later in the specification, my invention consists in the devices described and claimed and the equivalents thereof.

In the drawings Figure 1 is a view of the circle swing in use, Fig. 2 is a part sectional elevation of the upper circular track and the upper connections of the driving mechanism. Fig. 3 is a part sectional side view of the ratchet and pawl by which the traction wheels are rotated. Fig. 4 is a part sectional detail of the propelling mechanism in the car.

As is clearly shown in the drawings the swing consists in a central standard 1 to the top of which is secured a spider 2 carrying a circular track 3. At the top of standard 1 is a revoluble collar 4 carrying a number of radially disposed arms 5, there being as many of these arms as there are passenger cars. Each arm 5 carries a bracket 6 having a horizontally disposed gudgeon 7 upon which loosely revolves a flanged wheel 8 that rolls upon the circular track 3 when the arms 5 are revolved. At the outer end of each arm 5 is a bracket 9 that carries the gears and rods by which the wheel 8 is propelled as will presently be described. Near the outer end of each arm 5 is also a bracket 10 from which are suspended by suitable pin connections, the suspension rods that carry the car. These suspension rods are designated by the numerals 11, 12, and 13. The car 14 is secured to the lower end of the suspension rods by pin connections.

The propelling mechanism comprises a ratchet and pawl operating in communication with wheel 8, and the means for actuating the ratchet and pawl.

15 indicates a flanged hub, the flanges being secured to wheel 8 by bolts 16 or their equivalents, and the hub being formed with recesses 17 adapted to receive the loosely pivoted pawls 18. The outer ends of the pawls 18 are adapted to engage the teeth 19 of an internal ratchet wheel 20 which is revolubly mounted on the gudgeon 21 carried by the flanged hub 15. The hub of ratchet wheel 20 is threaded to be received by the internally thread cup 22 which is pin connected to the shaft 23 of a bevel gear 24 supported by suitable bearings in bracket 9. A bevel gear 25 meshes with gear 24 and its vertical shaft 26 carries a universal joint 27 to which is connected the torsion rod 28 that leads to the car.

In the rod 28 is a telescoping extensible connection 29ᵃ that permits the rod 28 to lengthen and shorten according to the tilt of the car while in use. The lower end of torsion rod 28 carries a bevel gear 29 which meshes with a second bevel gear 30, both gears being carried by suitable bearings in a frame 31 secured to the car 14. The shaft 32 of gear 30 carries a suitable hand crank 33 by which the internal ratchet wheel 20 is rotated to propel the flanged wheel 8, through the medium of the pawls 18. When the crank 33 is turned in one direction it will cause the pawls 18 to lock the traction wheel 8 to the internal ratchet 20 so that the wheel 8 will revolve the arms 5 to move the cars ahead. When the crank 33 is turned in the opposite direction or when it is allowed to hang freely it will be inoperative, because the forward movement of the wheel 8 permits the pawls 18 to drop out of engagement with ratchet wheel 20 and the latter, together with its gears and rod 8 will remain out of action as regards wheel 8.

Since the pawls 18 do not operatively engage the ratchet wheel 20 unless wheel 20 is rotated faster than wheel 8, it follows that if the occupant of one car is turning his hand crank at a faster rate than the occupant of another car can turn his crank, the occupant of the second car will not be inconvenienced, because his crank will be inoperative to propel the traction wheel of his car until the speed of the swing is reduced; and the movement of the car will not turn his crank.

By the means above described I have produced a simple, strong and safe construction for circle swings in which the occupant of each car can assist in propelling the swing, if he desires, or the occupant of any one car can do all of the work. As the speed increases, the cars, by means of their pivoted suspension rods 11, 12 and 13, are permitted to swing out and describe a larger circle, while the torsion rods 28 adapt themselves both angularly and longitudinally to the position of the car without interfering with their effectiveness for driving. The occupant of the car maintains a normal, comfortable position regardless of the speed of the car because there is no tendency to throw the occupant out of the car when the speed increases, and the hand crank 33 always maintains its proper position with relation to the operator, being attached to the car body and not being affected by the change in angularity or length of rod 28.

What I claim is.

1. In a circle swing, the combination of a standard, a stationary circular track supported by the upper part of said standard, radially disposed arms revolubly mounted on said standard above said track, traction wheels carried by said arms and adapted to roll on said track, a car suspended from each arm, an extensible drive shaft, a flexible joint in said shaft near its upper end, driving means carried by the car and operatively connected to the lower part of said drive shaft, and power transmitting means operatively connecting said flexible joint and said traction wheel, said transmitting means adapted to propel said wheel in one direction only.

2. In a circle swing, the combination of a standard, a stationary circular track near the upper part of said standard, radial arms revolubly mounted on said standard above said track, traction wheels carried by said arms and adapted to roll on said track, cars suspended from said arms, an extensible drive shaft, a flexible joint carried by said shaft near its upper end, driving means carried by the car and operatively connected to the drive shaft, and a pair of bevel gears carried by said arms, one of said gears operatively connected to said flexible joint, a pawl carried by said traction wheel, and a circular ratchet operatively connected to the second bevel gear of said pair, for the purposes set forth.

In testimony whereof, I affix my signature in presence of two witnesses.

JAMES A. KOEHLER.

Witnesses:
NELLIE M. ANGUS,
J. E. GRIMES.

Copies of this patent may be obtained for five cents each, by addressing the "Commissioner of Patents, Washington, D. C."